United States Patent [19]

Ong

[11] Patent Number: 5,260,646
[45] Date of Patent: Nov. 9, 1993

[54] LOW POWER REGULATOR FOR A VOLTAGE GENERATOR CIRCUIT

[75] Inventor: Adrian H. Ong, Boise, Id.

[73] Assignee: Micron Technology, Inc., Boise, Id.

[21] Appl. No.: 814,989

[22] Filed: Dec. 23, 1991

[51] Int. Cl.$^5$ .............................................. H03K 3/01
[52] U.S. Cl. .................................... 323/349; 323/265;
  323/313; 365/189.09; 307/296.1; 328/155
[58] Field of Search .............................. 323/312–315,
  323/349, 265; 365/189.09; 307/296.1, 296.2,
  296.6, 510, 511; 363/60; 328/155

[56] References Cited

U.S. PATENT DOCUMENTS

| | | | |
|---|---|---|---|
| 4,322,675 | 3/1982 | Lee et al. | 323/277 |
| 4,471,290 | 9/1984 | Yamaguchi | 323/274 |
| 4,752,699 | 6/1988 | Cranford, Jr. et al. | 307/296.2 |
| 4,920,280 | 4/1990 | Cho et al. | 307/296.2 |
| 4,961,007 | 10/1990 | Kumanoya et al. | 307/296.2 |
| 4,964,082 | 10/1990 | Sato et al. | 307/296.2 X |
| 5,003,197 | 3/1991 | Nojima et al. | 307/296.2 |
| 5,029,282 | 7/1991 | Ito | 307/296.2 X |
| 5,039,877 | 8/1991 | Chern | 307/296.2 |
| 5,113,088 | 5/1992 | Yamamoto et al. | 307/296.2 |

Primary Examiner—Emanuel T. Voeltz
Attorney, Agent, or Firm—Susan B. Collier

[57] ABSTRACT

A voltage generation circuit reduces power consumption by providing a regulator circuit wherein the current in an inverter leg of the generator is proportional to the current in a sense element portion of the regulator. The inverter leg comprises n- and p-channel transistors which are gated by signals from the sense element portion.

31 Claims, 7 Drawing Sheets

LOW POWER REGULATOR FOR A VOLTAGE GENERATOR CIRCUIT

FIELD OF THE INVENTION

This invention relates generally to voltage generator circuits for generating a desired potential for a semiconductor substrate layer of an integrated circuit, and more particularly to regulator circuit portions of such voltage generator circuits.

BACKGROUND OF THE INVENTION

A technique for improving the performance of an integrated circuit formed on a substrate, such as a memory device, is to provide a separate potential to the substrate instead of coupling the substrate to a predetermined potential, usually the 5 volt power supply or a ground reference potential, as appropriate. The supply potential may be either a positive 5 volts or a negative 5 volts. The value of the potential may be more negative than either the ground reference potential or the negative 5 volts or more positive than the positive 5 volts. Typically, a p-type substrate layer or well is pumped to a more negative potential by a substrate pump.

The substrate potential is typically generated with an on-chip circuit containing a substrate charge pump used to pump the p-type substrate to a more negative potential. When the substrate layer or well potential changes from a correct value due to leakage or a change in the operating condition of the integrated circuit, a regulator detects the change and provides an output signal to activate a charge pump. In turn, the charge pump pumps charge into the substrate layer until the substrate layer or well potential returns to the desired or regulated value. The regulator then provides an output signal to deactivate the charge pump.

A high voltage pump is typically used to pump positive charge into a high voltage bus, such as a wordline driver.

A voltage generator circuit includes the regulator for sensing the potential of the substrate and for providing an output that is coupled to an inverter. The inverter provides a control signal directly or indirectly to the charge pump. Normally a hysteresis circuit couples the control signal to the charge pump input terminal. The charge pump activates and provides an output that is desired to be regulated. The hysteresis circuit eliminates erratic switching by preventing the charge pump from constantly turning on and off.

Voltage generator circuits draw a significant current that flows directly out of the p-type substrate through the sense element. This current directly and indirectly increases the power requirements of the voltage generator circuit; directly because of the power consumption due to the current flowing through circuit components and indirectly due to the added current requirements to compensate for the current flowing out of the substrate through the sense element. This power consumption is only significant during standby; and since most of the standby current is generated in the regulator circuit, reductions of the standby current in the regulator portion of the memory device significantly enhance the operation of the memory device. Normally, in the case of a negatively charged p-type substrate layer or well, the sense element current further raises the substrate potential. Therefore, the charge pump must be activated more frequently to maintain a nominal substrate potential.

Figure 1:
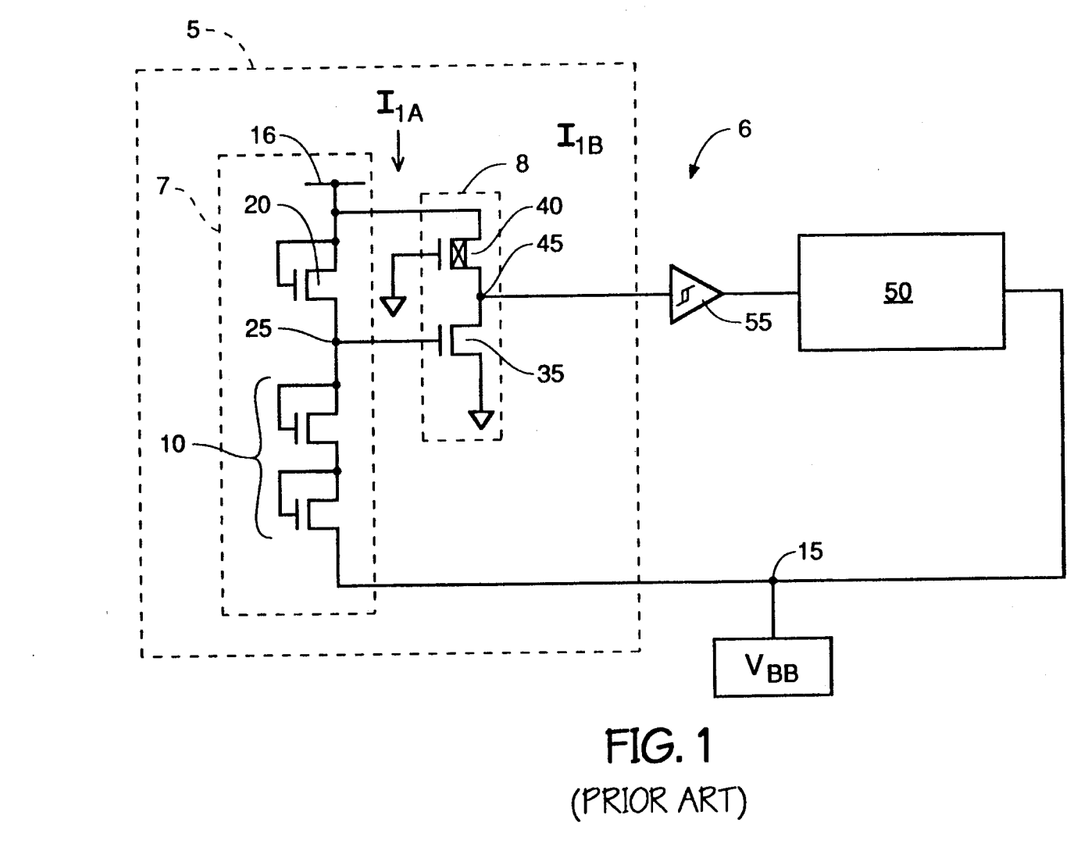
FIG. 1 depicts a prior art voltage generator having a sense element and inverter for regulating charge pump activation.

A regulator circuit 5 is shown in detail in the voltage generator circuit 6 depicted in FIG. 1. The regulator circuit 5 comprises the sense element 7 and an inverter 8. The sense element 7 comprises two metal oxide semiconductor field-effect transistors (MOSFETs) connected as a diode series 10, although more or less diodes may be used depending on the desired value of $V_{BB}$. The diode series 10 is connected directly to the substrate layer at a sense node 15 and is connected to $V_{CC}$ 16 through a load element 20. The MOSFET diode series 10 and the load element 20 are connected at an intermediate node 25. The diode series 10 and the load element 20 are known as a level shifting circuit since the potential at the intermediate node 25 is dependent on the potential drop across the diodes series 10. As the sense node potential $V_{BB}$ increases due to circuit leakages, the intermediate node potential increases. Eventually, the intermediate node potential will be high enough to gate the inverter 8. The inverter 30 comprises an input switching n-type MOSFET (NMOSFET) 35 serially connected to a load p-type MOSFET (PMOSFET) 40 at the inverter output 45. Thus, a shift in the potential at the intermediate node from a low level to a high level causes the inverter to activate a charge pump 50 through the hysteresis circuit 55. The charge pump output is connected to the sense node 15, and the activated charge pump reduces the potential of $V_{BB}$. This reduced potential is also reflected at the intermediate node 25 and the inverter output signal at 45 switches states and the charge pump is turned off.

A significant current draw in the circuit of FIG. 1 is the current consumed in the inverter 8. Since the gate of transistor 40 is tied to ground, whenever transistor 35 is gated there is a high current consumption through the inverter 8. This current effected in the inverter due to a continually gated device is called bleeder current.

Figure 2:
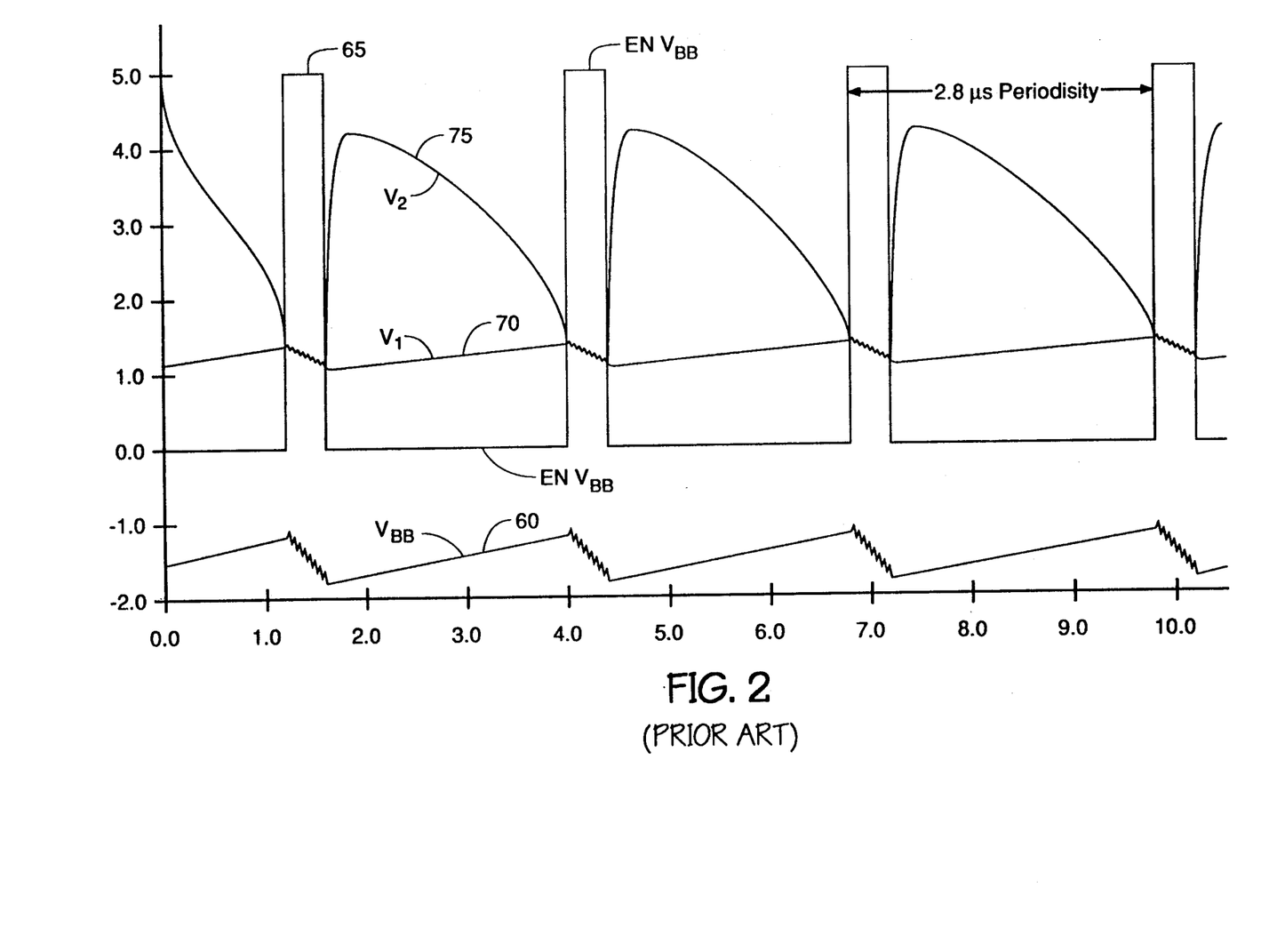
FIG. 2 is a timing diagram relating the pertinent potentials of the prior art voltage generator of FIG. 1.

FIG. 2 is a timing diagram based on a computer simulation of the circuit of FIG. 1 and relating the sense node potential, $V_{BB}$ 60, to the charge pump input potential, $ENV_{BB}$ 65. The sense element provides an output signal, $V_1$ 70, at the intermediate node to the inverter input. The inverter output provides a control signal, $V_2$ 75. The control signal, $V_2$ 75, activates the charge pump through the hysteresis circuit. By analyzing $ENV_{BB}$ 65 it can be seen that the charge pump is activated every 2.8 microseconds when $ENV_{BB}$ goes high. This charge pump activation frequency is based on the circuit having a large load. The frequency increases with a decrease in load.

Since the charge pump is typically 25-35% efficient, an additional 1 microamp ($\mu$A) of current flowing in the sense element translates to an additional 3-4 $\mu$A of current that must be consumed by the charge pump. Typically, 5 $\mu$A of current is required by the sense element to maintain a reasonably short delay time to respond to changes in the substrate potential. Thus, a total of 20-25 $\mu$A of additional current is consumed by the voltage generator circuit.

One simple way to reduce the current requirements of the voltage generator circuit is to decrease the current flowing through the sense element by increasing the value of the load element. Similarly the current in the inverter can be decreased by increasing the resistance of transistor 35, thereby reducing the bleeder current. Such a decrease in current in the inverter, however, produces a corresponding undesirable increase in the delay time in response to changes in the substrate potential. Thus, the accuracy of the regulated substrate potential decreases resulting in decreased performance and, possibly, decreased immunity to latch-up of the integrated circuit.

What is desired is a voltage generator circuit for regulating the potential of a substrate on an integrated circuit having a low current requirement yet maintaining a reasonable delay time in responding to changes in the substrate potential.

SUMMARY OF THE INVENTION

The invention is a voltage generator circuit which reduces the current in the regulator circuit by designing the regulator circuit such that the current in the inverter leg of the circuit is proportional to the current in the sense element portion rather than being at a continually high value. Two outputs of the sense element gate the n-channel and p-channel transistors of the inverter. The outputs are interposed with a current limiting device to provide a difference in potential between the gates of the n-channel and p-channel transistors of the inverter.

The elimination of bleeder current by providing inverter current proportional to sense element current reduces the total current consumption over the prior art, thereby maximizing power savings. Since the current reduction is accomplished without increasing the resistance of the inverter, the performance of the regulator is not negatively affected as it is when the resistance of the inverter is increased to control current. Thus, speed is maintained in sensing the substrate potential and actuating and deactuating the charge pump in response to changes in potential of the substrate.

DETAILED DESCRIPTION OF THE PREFERRED EMBODIMENT

Figure 3:
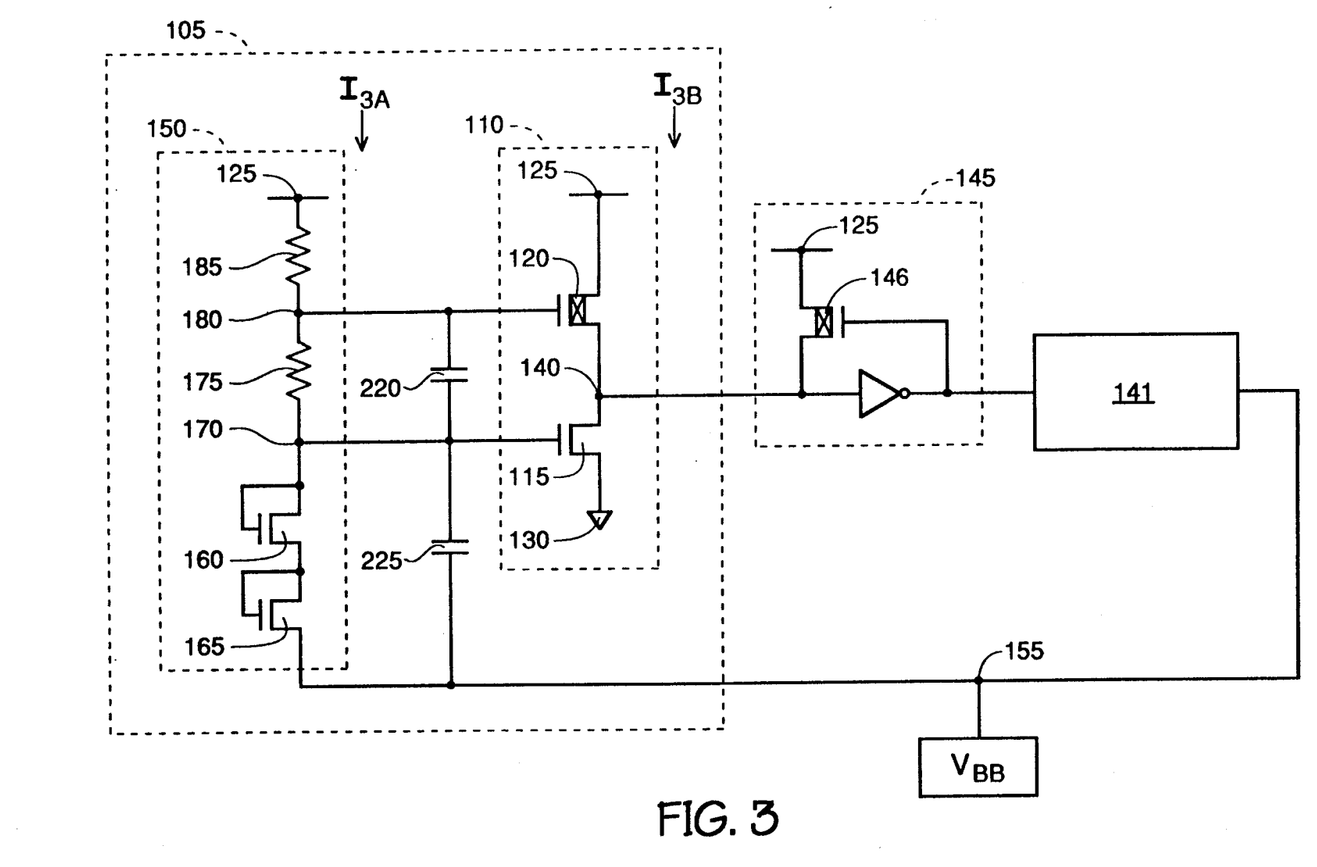
FIG. 3 depicts the substrate voltage generator of the preferred embodiment having a sense element and inverter for regulating charge pump activation.

The voltage generation circuit of the preferred embodiment is shown in FIG. 3. The regulator portion 105 of the voltage generation circuit comprises an inverter leg 110 having n-channel 115 and p-channel 120 metal oxide semiconductor field-effect transistors (MOSFETs) serially connected at an output node 140. The transistors 115 and 120 are interposed between a supply potential and a reference potential at a supply node 125 and a reference node 130 respectively. The supply potential typically is a $V_{CC}$ of 5 volts and the reference potential is typically a ground potential of zero volts.

An output signal at the output node 140 of the inverter leg 110 regulates a charge pump 141 through a hysteresis circuit 145. The output signal at output node 140 is inverted to the gate of a hysteresis transistor 146. A high potential at output node 140 causes hysteresis transistor 146 to actuate pulling node 140 harder to the high potential of the supply potential through transistor 146. The hysteresis circuit 145 eliminates erratic switching.

Two output signals from a sense element portion 150 of the regulator 105 provide independent gating signals to the n-channel 115 and p-channel 120 transistors of the inverter leg 110. The circuit is designed such that the current in the inverter leg 110 is proportional to the current in the sense element 150 due to the fact that the p-channel 120 transistor is controllably gated by a signal from the sense element 150.

The sense element 150 is interposed between the sense node 155 and the supply node 125. The sense element 150 comprises serially connected n-channel MOSFETs configured as diodes 160 and 165 and interposed between a gate node 170 of the n-channel transistor 115 and the sense node 155. A potential at the gate node 170 provides the gating signal to the n-channel transistor 115. A first current limiting device 175 is interposed between the gate node 170 and a gate node 180 of the p-channel transistor 120. A second current limiting device 185 is interposed between the gate node 180 and the supply node 125. The potential at the gate node 180 provides the gating signal to the p-channel transistor 120. The gating of the p-channel transistor is directly proportional to the potential at the gate node 180. Therefore as the potential on gate node 180 decreases, transistor 120 is turned on harder and the current in the inverter leg 110 increases.

The potential at the gate node 170 is equal to the sum of the diode 160 and 165 threshold voltages and the voltage at the sense node, $V_{BB}$. The potential at the gate node 180 is equal to sum of the diode 160 and 165 threshold voltages, the voltage at the sense node, $V_{BB}$, and the voltage drop, $I_{3A}R_1$, across the first current limiting device, where $I_{3A}$ is the current in the sense element 150 and $R_1$ is the resistance of the first current limiting device 175.

Capacitor 220 interposed between gate nodes 180 and 170 and capacitor 225 interposed between gate node 170 and sense node 155 are employed to provide a faster response to changes in $V_{BB}$.

Figure 4:
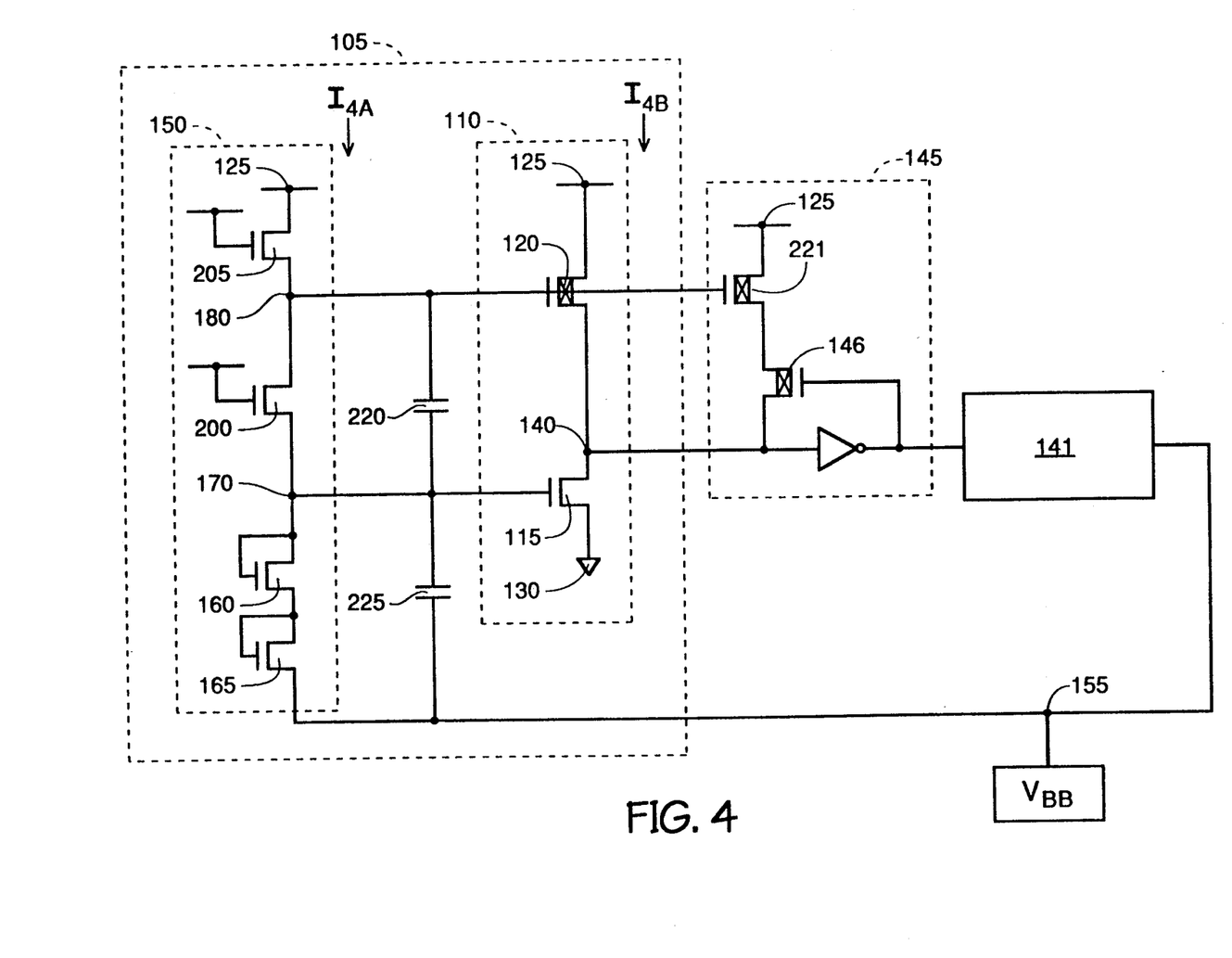
FIG. 4 depicts the voltage generator of FIG. 3 wherein n-channel transistors are configured as the current limiting devices and comprising an additional transistor for improving the hysteresis responses.

The circuit of FIG. 3 may be implemented as shown in FIG. 4. The current limiting devices 175 and 185 of FIG. 3 are implemented with n-channel MOSFETs 200 and 205 respectively. Analyzing the circuit of FIG. 4 will provide an understanding of the current limiting properties of the invention. When the sense node 155 is at the desired potential transistor 115 is not gated, and transistor 120 is gated. A high potential is felt at output node 140 through gated transistor 120. This high potential at output node 140 keeps the charge pump 141 off and no current flows in the inverter leg 110.

As the potential of the substrate floats high due to circuit leakages, transistor 115 is actuated; the voltage at node 140 goes low through actuated transistor 115 and the charge pump turns on. As the charge pump pumps the substrate to a lower potential the potentials at nodes 170 and 180 decrease. The decreases in potential at nodes 170 and 180 is directly proportional to the increase in current $I_{4A}$ in the sense element. The current $I_{4A}$ increases due to an increase in the potential difference between the supply node 125 and the sense node 155 as the sense node potential decreases. Eventually the potential at node 180 decreases enough to actuate transistor 120, although it is possible for transistor 120 to remain actuated throughout the cycle, both during the actuation and deactuation of the charge pump 141. Transistor 120 is turned on harder as the gate potential at node 180 continues to decease. In the prior art depicted in FIG. 1 transistor 40 is continually gated and the current $I_{1B}$ in the inverter 8 is at a maximum level as long as transistor 35 is actuated. Since the current $I_{4B}$ is increasing only as the substrate potential decreases it does not remain at the high level of the prior art, but is proportional to the current $I_{4A}$ in the sense element 150. The sense element current is actually less than the inverter current due to the current limiting transistors 205 and 200.

Eventually the potential on node 170 decrease enough to deactuate transistor 115. At that time the potential at node 140 is pulled high through activated transistor 120, and the charge pump is turned off.

A modification to the hysteresis circuit 145 limits the current of the hysteresis circuit 145. The current limiting is accomplished by interposing p-channel MOSFET 221 between transistor 146 and supply node 125 and by gating transistor 221 with the signal at the gate node 180. When the output node 140 is pulled to the high potential through actuated transistor 120, the charge pump is deactuated, and node 180 has a tendency to float to a higher potential due to current leakages. As the potential of node 180 increases the current through transistor 221 decreases due to the its decreasing gate potential at node 180. Therefore, power savings are maximized since the current only increases in response to circuit changes and does not remain at a high level.

The size of transistors 200 and 205 can be adjusted with respect to each other in order to control the potentials at nodes 180 and 170. As the ratio of the resistance of transistor 205 to the resistance of transistor 200 increases the potentials on nodes 170 and 180 approach the same value.

The threshold voltages are adjusted to determine the potential necessary to actuate transistor 115 and turn on the charge pump. The potential is determined from the formula $V_{BB} = V_{T115} - (V_{T165} + V_{T160})$, where $V_{BB}$ is the potential at which the charge pump is turned on, $V_{T165}$ is the threshold voltage of transistor 165, $V_{T160}$ is the threshold voltage of transistor 160, and $V_{T115}$ is the threshold voltage of transistor 115.

Figure 5:
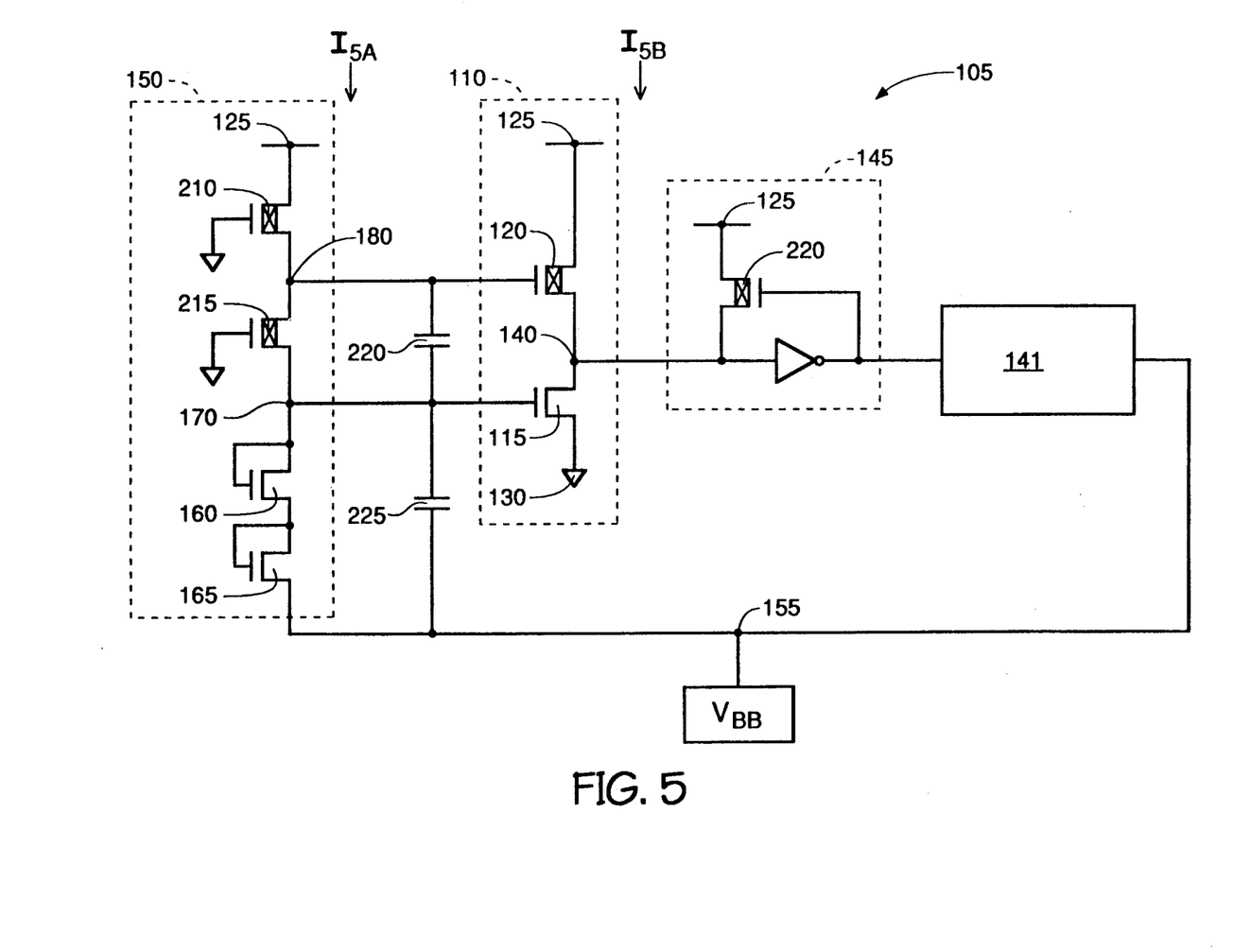
FIG. 5 depicts the voltage generator of FIG. 3 wherein p-channel transistors are configured as the current limiting devices and comprising an additional transistor for improving the hysteresis responses.

In FIG. 5 the current limiting devices are implemented with p-channel MOSFETs 215 and 210. In this case the voltage at node 180 is limited to a potential above ground equal to the threshold voltage of transistor 215. This limiting of the potential at node 180 limits the current $I_{5A}$ and $I_{5B}$ as $V_{BB}$ becomes more negative resulting in power savings.

In keeping with present design considerations, either n-channel or p-channel current limiting configurations can be utilized in the sense element portion of the invention.

Figure 6:
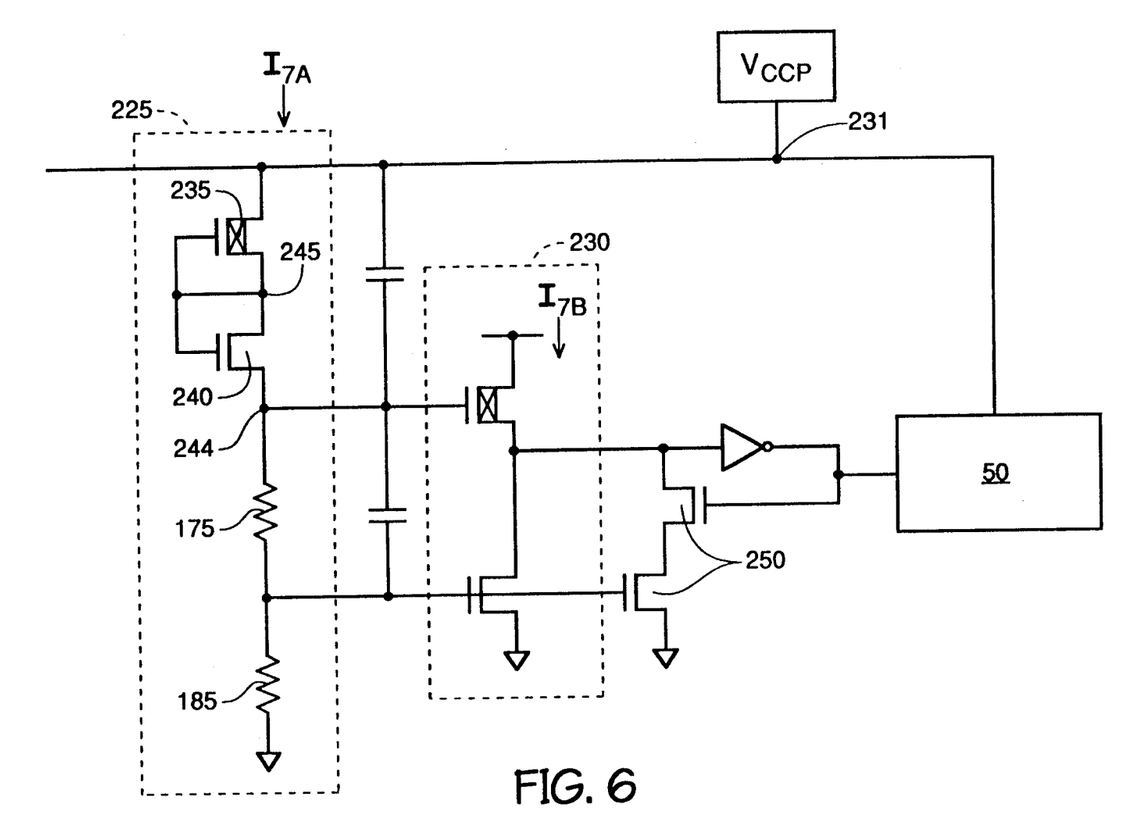
FIG. 6 depicts a voltage generator circuit for generating a potential generally higher than the supply potential.

FIG. 6 depicts a voltage generation circuit for generating a potential usually higher than the supply potential. In the regulator circuit portion of the invention the n- and p-channel transistors 115 and 120 of the inverter leg 110 of the circuit of FIG. 3 are interchanged with respect to the current limiting devices 175 and 185 to form the inverter leg 230 of the circuit of FIG. 6. The diode configurations are implemented with serially connected commonly gated p-channel 235 and n-channel 240 transistors. The gates of transistors 235 and 240 are tied to the serial connection 245 of transistors 235 and 245. The hysteresis transistors 250 of this alternate embodiment are n-channel transistors. This implementation is effective in sensing the potential at sense node 231. The desired potential, $V_{CCP}$, is typically utilized to charge a high voltage bus.

Figure 7:
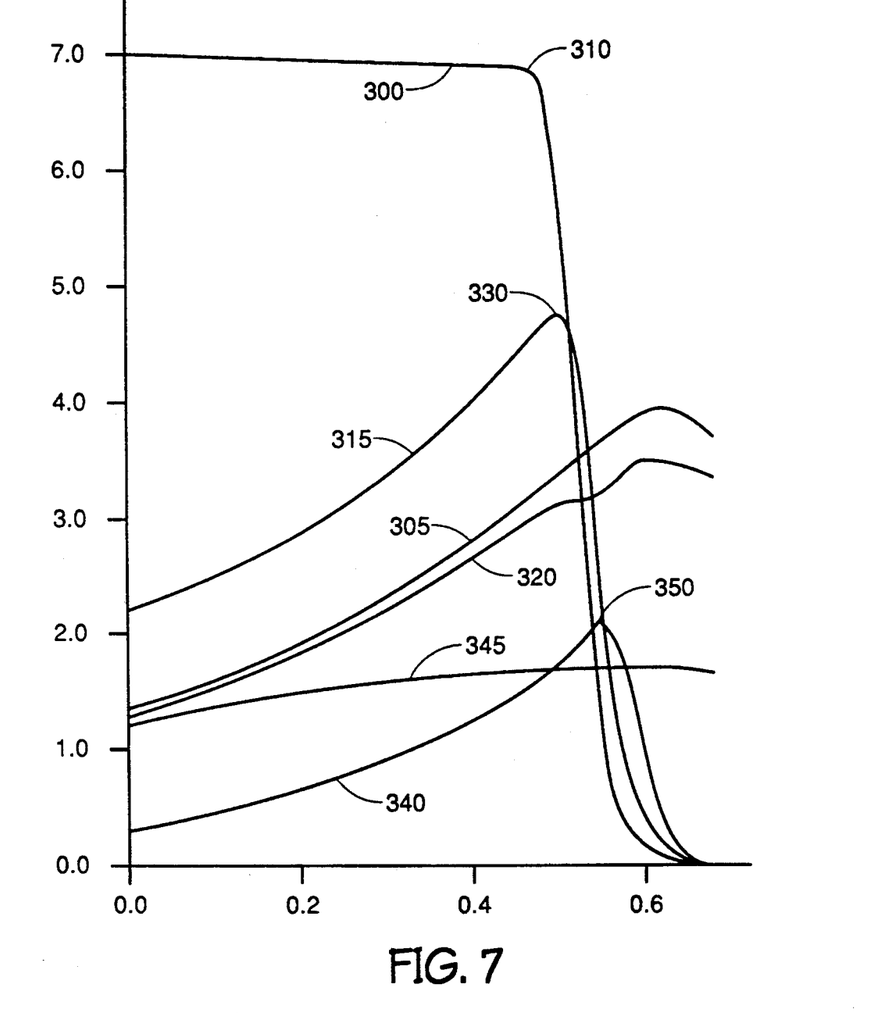

FIG. 7 is a graphical representation based on a simulations of the circuits depicted in FIGS. 1, 4, and 5. The graph compares the currents in the sense element and inverters of the regulator portion of the voltage generation circuits. The current comparisons are valid since each of the circuits used devices having substantially the same size and having substantially the same threshold characteristics. Therefore the width and the length of the transistors are not a factor in the circuit comparisons. The currents are plotted against time. Trace 300 represents the current in the inverter, and trace 305 represents the current in the sense element of FIG. 1. It can be seen from the graph that the current in the inverter remains at a maximum level until the charge pump is shut off at point 310 when the inverter current drops approximately to zero. The large current consumption in the invertor is a direct result of the bleeder current.

Traces 315 represents the current in the inverter of FIG. 4 and proportionally follows the current of the sense element shown by trace 320 until the charge pump is shut off at point 330. Summing the currents of traces 315 and 320 pertaining to FIG. 4 results in significantly less total current than by summing the currents of traces 300 and 305 pertaining to FIG. 1.

Trace 340 shows the increase in current in the inverter leg of FIG. 5 with respect to the minimal increase in current in the sense element shown by trace 345. The current in the sense element is controlled due to the constant voltage maintained on the gate of the p-channel transistor of the inverter as a result of the limiting threshold voltage of the p-channel current limiting device interposed between the n- and p-channel transistors of the inverter. The currents in the inverter and sense element of FIG. 5 are low when compared to the corresponding currents of the prior art shown in FIG. 1 and the inventive embodiment of FIG. 4. The inverter current of FIG. 5 continues to increase until the charge pump is turned off at point 350. An analysis of the traces of FIG. 7 is effective in showing the power savings of the invention over the prior art of FIG. 1 having the continually gated transistor in the inverter leg. The current consumption of both the circuit of FIG. 4 and of FIG. 5 is much less than the current consumption of the circuit of FIG. 1.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

I claim:

1. A circuit device comprising a charge pump circuit, said circuit device regulating a charge pump circuit output potential at a charge retention node, the circuit device further comprising:

a) a sensing circuit having a first and a second intermediate node, said sensing circuit in electrical communication with the charge retention node, a potential at said first and second intermediate nodes affected by a potential at said charge retention node;

b) an inverter a first and a second switching device in electrical communication with said sensing circuit, said first switching device controlled by a potential at said first intermediate node and said second switching device controlled by a potential at said second intermediate node; and c) a resistive device interposed between said first and second intermediate nodes and designed such that potentials on said first and second intermediate nodes have a potential difference equal to a potential of said resistive device.

2. The circuit device as specified in claim 1, wherein a current of said inverter circuit is proportional to a current in said sensing circuit when said first and second switching devices are actuated, said current of said inverter circuit portional to a current in said sensing circuit due to potential changes at said second intermediate node, said potential changes effected by changes in potential at said charge retention node when said charge pump is actuated.

3. The circuit device as specified in claim 1, further comprising an output terminal of said inverter circuit, a control signal at said output terminal controlling the charge pump circuit, the charge pump circuit actuated and deactuated in response to said control signal, an actuated charge pump actively changing a potential of said charge retention node.

4. The circuit device as specified in claim 3, wherein said second switching device when actuated in conjunction with said first switching device being deactuated pulls said output terminal to a first circuit potential, said first circuit potential deactuating said charge pump, and wherein said first switching device when actuated pulls said output terminal to a second circuit potential, said second circuit potential actuating said charge pump.

5. The circuit device as specified in claim 4, wherein said first circuit potential is a reference potential and said second circuit potential is a supply potential.

6. The circuit device as specified in claim 4, wherein said first circuit potential is a supply potential and said second circuit potential is a reference potential.

7. The circuit device as specified in claim 3, wherein said output terminal is a serial connection of said first and second transistor.

8. The circuit device as specified in claim 3, further comprising a hysteresis circuit electrically interposed between said output terminal and said charge pump circuit, said hysteresis circuit minimizing erratic switching of said charge pump.

9. The circuit device as specified in claim 8, wherein said hysteresis circuit comprises a hysteresis switching device directly gated by a potential on said second intermediate node in order to reduce current consumption in said hysteresis circuit.

10. The circuit device as specified in claim 1, wherein said first and second switching devices are metal oxide semiconductor field effect transistors having opposite n-and p-type doping characteristics.

11. The circuit device as specified in claim 1, further comprising at least one diode configuration interposed between said charge retention node and said first intermediate node, said diode configuration determining a potential difference between said charge retention node and said first intermediate node, the potential at said first intermediate node equal to the sum of a threshold voltage of said diode configuration and the charge pump circuit output potential, the potential at said second intermediate node equal to the potential at said first intermediate node plus the potential of said resistive device, said charge pump activated in response to at least an actuated first switching device, and said charge pump deactivated in response to an activated second switching device in conjunction with a deactivated first switching device.

12. The circuit device as specified in claim 11, where said diode configuration comprises at least one n-channel metal oxide semiconductor field effect transistor configured as a diode.

13. The circuit device as specified in claim 12, wherein said diode configuration comprises a p-channel and an n-channel metal oxide semiconductor field effect transistor commonly gated at a serial connection of said p-channel and n-channel metal oxide semiconductor field effect transistor.

14. The circuit device as specified in claim 11, wherein said charge pump is actuated when the charge pump circuit output potential is equal to the difference of a threshold voltage of said first switching device and the total threshold voltage of said diode configuration.

15. The circuit device as specified in claim 1, further comprising:

a) a first capacitive element interposed between said first and second intermediated nodes; and b) a second capacitive element interposed between said first intermediate node and said charge retention node, said first and second capacitive elements providing a substantially fast signal response at said output terminal to changes in potential of the charge retention node.

16. The circuit device as specified in claim 1, further comprising a current limiting device electrically interposed between a circuit node and said second intermediate node, a ratio of a resistance of said current limiting device to a resistance of said resistive device determining a difference in potential between said first and second intermediate nodes, said current limiting device limiting current in said sensing circuit, said circuit node capable of being in electrical communication with a first circuit potential.

17. The circuit device as specified in claim 16, wherein said first circuit potential is equal to a supply potential.

18. The circuit device as specified in claim 16, wherein said first circuit potential is equal to a reference potential.

19. The circuit device as specified in claim 16, wherein said current limiting device and said resistive device are n-channel metal oxide semiconductor field effect transistors configured as resistors.

20. The circuit device as specified in claim 16, wherein said current limiting device and said resistive device are p-channel metal oxide semiconductor field effect transistors configured as resistors.

21. The circuit device as specified in claim 20, wherein the potential at said second intermediate node is equal to the threshold voltage of said resistive device.

22. A method for regulating a charge pump circuit output potential of a charge pump at a charge retention node, comprising:

a) sensing the potential of the charge retention node;

b) providing first and second switching signals to first and second switching devices respectively in response to said sensing;

c) controlling an activation and deactivation of the charge pump circuit with an output signal at an output terminal of said first and second switching devices;
d) activating said charge pump to pump said charge retention node to a desired potential in response to said output signal;
e) deactivating said charge pump in response to said output signal when said charge retention node has attained said desired potential;
f) actuating at least said first switching device to precipitate an actuation of said charge pump, at least said first switching device remaining actuated during said actuation of said charge pump, an actuation of said second switching device proportional to the changes in potential at said sense node such that as the potential at said sense node approaches said desired potential, said second switching device turns on harder such that a current through said first and second switching devices increases proportional to increases in current in a sense element portion, said current in said sense element portion increasing as the potential of said sense node approaches said desired potential, said sense element portion providing said first and second switching signals; and
g) actuating said second switching device and deactuating said first switching device to precipitate the deactuation of said charge pump thereby interrupting current flow through said first said second switching devices.

23. The method as specified in claim 22, further comprising:
a) pulling said output terminal to a first circuit potential through an actuated first switching device when the potential of said charge retention node is different than said desired potential; and
b) pulling said output terminal to a second circuit potential through an actuated second switching device when the potential of said charge retention node is at said desired potential.

24. The method as specified in claim 23, wherein said first circuit potential is a supply potential and said second circuit potential is a reference potential.

25. The method as specified in claim 23, wherein said first circuit potential is a reference potential and said second circuit potential is a supply potential.

26. The method as specified in claim 23, wherein said pulling further comprises:
a) controlling said first switching transistor with a potential having a difference in potential from the potential of the charge retention node equal to a threshold voltage level of at least one diode configuration, such that said first switching transistor is gated when the voltage of said sense node potential is equal to the difference in potential between a threshold voltage of said first switching device and a total threshold voltage of said diode configuration; and
b) controlling said second switching transistor with a potential having a difference in potential from the potential of the charge retention node equal to the total threshold voltage of said diode configuration and a voltage drop across a current limiting device, said voltage drop equal to the product of the resistance of said current limiting device and the current through said current limiting device, said current fluctuating with current changes induced by fluctuations in the potential of said charge retention node, a current in said first and second switching devices proportional to the current fluctuations in said current limiting device when said first and second switching devices are actuated.

27. The method as specified in claim 22, further comprising capacitively coupling said first and second switching devices at first and second control inputs of said first and second switching devices respectively and capacitively coupling said first control input to said charge retention node in order to improve circuit responses to fluctuations in the potential of said charge retention node.

28. The method as specified in claim 22, further comprising:
a) inverting said output signal;
b) gating a hysteresis transistor with said output signal; and
c) pulling said output terminal to a circuit potential through said hysteresis transistor when said hysteresis transistor is actuated in order to minimize erratic switching of said charge pump, said hysteresis transistor actuated in response to the potential of said charge retention node being at said desired potential.

29. The method as specified in claim 28, further comprising gating a supplemental hysteresis transistor with said second switching signal, said output terminal pulled toward said circuit potential through said hysteresis transistor and said supplemental hysteresis transistor when said hysteresis transistor and said supplemental hysteresis transistor are actuated, said supplemental hysteresis transistor minimizing current consumption through said hysteresis transistor and said supplemental hysteresis transistor.

30. The method as specified in claim 29, wherein said circuit potential is a supply potential.

31. The method as specified in claim 29, wherein said circuit potential is a reference potential.

* * * * *